(12) United States Patent
Olix et al.

(10) Patent No.: US 8,019,831 B2
(45) Date of Patent: Sep. 13, 2011

(54) ADAPTIVE BUFFERING OF DATABASE SERVER RESPONSE DATA

(75) Inventors: David W. Olix, Woodinville, WA (US); Balendran Mugundan, Redmond, WA (US); Jimmy Y. Wu, Bellevue, WA (US); Chadwin J. Mumford, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 12/104,437

(22) Filed: Apr. 17, 2008

(65) Prior Publication Data

US 2009/0265398 A1    Oct. 22, 2009

(51) Int. Cl.
*G06F 15/16* (2006.01)
*G06F 15/173* (2006.01)
*G06F 15/177* (2006.01)

(52) U.S. Cl. ........ 709/217; 370/331; 370/351; 370/401; 455/416

(58) Field of Classification Search .......... 709/217–228; 707/102; 370/401, 331, 351; 455/416
See application file for complete search history.

(56) References Cited

U.S. PATENT DOCUMENTS

| | | | |
|---|---|---|---|
| 5,632,015 A | 5/1997 | Zimowski et al. | |
| 6,061,763 A | 5/2000 | Rubin et al. | |
| 6,470,344 B1 | 10/2002 | Kothuri et al. | |
| 7,263,520 B2 | 8/2007 | Biedenstein et al. | |
| 7,318,075 B2 | 1/2008 | Ashwin et al. | |
| 7,628,320 B2 * | 12/2009 | Rhoads ........................ | 235/375 |
| 2002/0010736 A1 * | 1/2002 | Marques et al. ............. | 709/201 |
| 2002/0107835 A1 | 8/2002 | Coram et al. | |
| 2005/0013462 A1 * | 1/2005 | Rhoads ........................ | 382/100 |
| 2005/0050039 A1 | 3/2005 | Theobald et al. | |
| 2006/0149702 A1 | 7/2006 | Kaluskar et al. | |
| 2006/0282456 A1 * | 12/2006 | Kapoor et al. ................ | 707/102 |
| 2007/0091848 A1 * | 4/2007 | Karia et al. ................... | 370/331 |
| 2007/0091907 A1 * | 4/2007 | Seshadri et al. .............. | 370/401 |
| 2007/0094374 A1 * | 4/2007 | Karia et al. ................... | 709/223 |
| 2007/0109266 A1 * | 5/2007 | Davis et al. ................... | 345/163 |
| 2007/0121580 A1 * | 5/2007 | Forte et al. .................... | 370/351 |
| 2007/0136311 A1 | 6/2007 | Kasten et al. | |
| 2007/0183342 A1 * | 8/2007 | Wong et al. ................... | 370/252 |
| 2007/0198482 A1 | 8/2007 | Allen et al. | |
| 2007/0207804 A1 * | 9/2007 | Sharma et al. ................ | 455/436 |
| 2007/0260780 A1 * | 11/2007 | Hiipakka et al. .............. | 710/52 |
| 2007/0264989 A1 * | 11/2007 | Palakkal et al. .............. | 455/416 |
| 2008/0292137 A1 * | 11/2008 | Rhoads ........................ | 382/100 |

(Continued)

OTHER PUBLICATIONS

"Using Adaptive Buffering", Microsoft Corporation, last viewed on Feb. 21, 2008, 2 pages.

(Continued)

*Primary Examiner* — Haresh N Patel

(57) ABSTRACT

Aspects of the subject matter described herein relate to buffering database server response data. In aspects, a database driver receives a request for data from a requester such as an application. Based on the request and information associated with a query, the database driver determines whether the requester is allowed to obtain data that has been previously buffered. If the database driver determines that the requester is not allowed to obtain data that has been previously buffered, the database driver indicates that blocks corresponding to the data may be freed. The database driver obtains new blocks from the database when they are needed. The database driver may determine whether to free blocks depending on a mode in which the blocks are accessed. When blocks are requested in a stream mode, they may be discarded once provided to a requester unless a bookmark has been set.

17 Claims, 6 Drawing Sheets

U.S. PATENT DOCUMENTS

2009/0016333 A1* 1/2009 Wang et al. .................. 370/389
2009/0183016 A1* 7/2009 Chan et al. .................. 713/323

OTHER PUBLICATIONS

"Fetch Buffer Size", retrieved from <<http://publib.boulder.ibm.com/infocenter/iisclzos/v9r1/index.jsp?topic=/.com.ibm.websphere.ii.federation.classic.configcommon.doc/reference/iiyfc-cfpfbs.htm>>, last viewed on Feb. 21, 2008, 2 pages.

"The Sybase Driver", BEA Systems, last viewed on Feb. 21, 2008, 9 pages.

Fields et al., "Web Development with JavaServer Pages" 2nd Edition, Chapter 9—"Working with Databases", retrieved at <<http://java.sun.com/developer/Books/javaserverpages/jsp_2ed/chapter9.pdf>>, Jan. 2002, 31 pages.

* cited by examiner

ADAPTIVE BUFFERING OF DATABASE SERVER RESPONSE DATA

BACKGROUND

A database may have a table that has millions of rows. These millions of rows may not fit into the main memory of a standard personal computer. Furthermore, a single row may include a large data field that by itself cannot fit into main memory of a standard personal computer. Some database drivers attempt to buffer all of the data for a particular request before providing a requester with the data. A database driver that attempts to service a request in this manner may run out of memory and not be able to provide the data.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to buffering database server response data. In aspects, a database driver receives a request for data from a requester such as an application. Based on the request and information associated with a query, the database driver determines whether the requester is allowed to obtain data that has been previously buffered. If the database driver determines that the requester is not allowed to obtain data that has been previously buffered, the database driver indicates that blocks corresponding to the data may be freed. The database driver obtains new blocks from the database when they are needed. The database driver may determine whether to free blocks depending on a mode in which the blocks are accessed. When blocks are requested in a stream mode, they may be discarded once provided to a requester unless a bookmark has been set.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
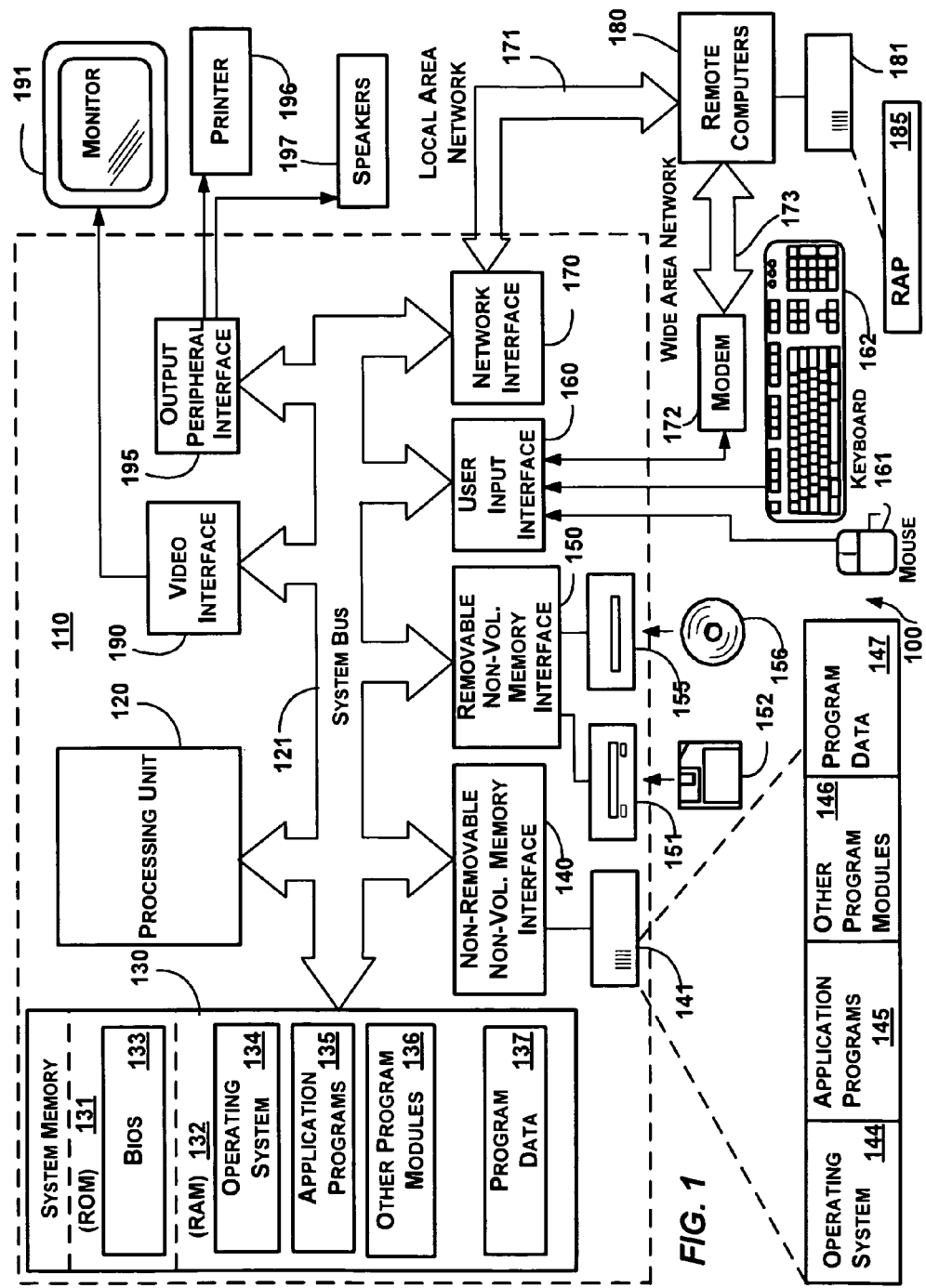
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Set Access

As mentioned previously, databases may have large data sets that are available for querying. A database driver that issues a query for a large data set may not have enough memory to hold the large data set. A data set may include any data available from a database. For example, a data set may include such things as one or more rows, update counts, OUT parameters from stored procedure calls, a combination of two or more of the above, and the like.

Figure 2:
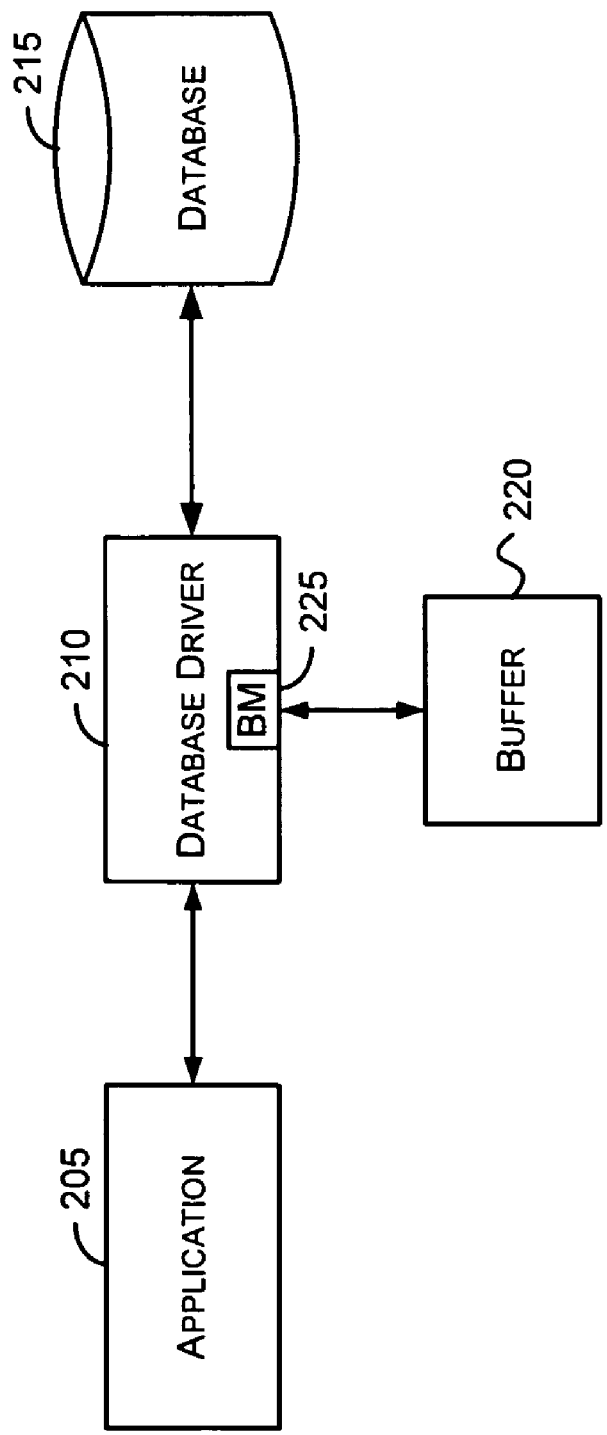
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes an application 205, a database driver 210, a database 215, a buffer 220, and may include other entities (not shown). The database driver 210 may include a buffer manager 225 that manages how blocks of memory are placed and removed from the buffer 220 as described in more detail below.

The various entities may be located relatively close to each other or may be distributed across the world. For example, the application 205 and the database driver 210 may be located on the same machine, while the database 215 may be located on a different machine. In another example, the application 205 may be located on a first machine, while the database driver 210 may be located on an application server that provides application services. In yet another example, the three entities may be located on the same machine. The examples above are not intended to be all-inclusive or exhaustive. Indeed, based on the teachings herein, those skilled in the art may recognize other configuration that fall within the spirit and scope of aspects of the subject matter described herein.

Where a line connects one entity to another, it is to be understood that the two entities may be connected (e.g., logically, physically, virtual, or otherwise) via any type of network including a direct connection, a local network, a non-local network, the Internet, some combination of the above, and the like.

The application 205 comprises any software that seeks access to the database. Such software may execute in user mode, kernel mode, or some combination thereof. In some embodiments, such software may be distributed across two or more machines.

The database driver 210 comprises a software component that provides a set of APIs to the application 205. The APIs allow the application to request data from the database 215 and to access the data once it is received. In one embodiment, the APIs may conform to the Java® Database Connectivity (JDBC) standard. In another embodiment, the APIs may conform to the Open Database Connectivity (ODBC) standard. In yet other embodiments, the APIs may conform to another standard or may provide a propriety interface.

The database 215 comprises a data source that is capable of storing data in a structure format. The database 215 is able to respond to requests for data by sending data to the requester (e.g., the database driver 210). The database may provide data in a tabular data stream (TDS) packets in which data from the database is placed and sent to the requester.

TDS packets may be fixed in size for a particular interaction with the database. For example, a database driver and a database may support 32 kilobyte TDS packets or some other arbitrary or requested sized packets. When requesting data from the database 215, the database driver 210 and the database 215 may negotiate the size of the TDS packets to use for sending data.

When sending data in TDS packets, a value may not fit in a single packet. Such values may be split across multiple TDS packets. In addition, two or more values or portions thereof may fit in one TDS packet. The stream of TDS packets sent from the database 215 to the database driver 210 may be thought of as a sequence of packets of data corresponding to the data set requested by the database driver 210, with columns, rows, and values spanning packets as needed.

Among other things, the database driver 210 is responsible for obtaining data from the database 215 and providing this data to the application 205. The database driver 210 may be constrained to support the APIs of previous versions of the database driver 210, such that an application structured for a previous version of the API cannot tell the difference when interfacing with the database driver 210.

In accordance with aspects of the subject matter described herein, the database driver 210 may receive an optional parameter that instructs the database driver 210 how the application 205 seeks to access the data. In one embodiment, the parameter may indicate that the application 205 seeks to access the data re-readable manner or as a stream.

Unless clear from the context otherwise, the term "array" is used herein to indicate that the application seeks to access the data in a re-readable manner. The term "array" does not necessarily mean that the data is to be provided as an array or in an array data structure In one embodiment, data may be requested for access in a re-readable manner using a connection property. In one example, using a connection property (e.g., responseBuffering), a requester may indicate that data is re-readable by default by setting responseBuffering=full. In another example, a requester may indicate that data is not re-readable by default by setting responseBuffering=adaptive. The above examples are not intended to be all-inclusive or exhaustive. Based on the teachings herein, those skilled in the art may recognize other mechanisms for indicating that data is re-readable or not re-readable. Such other mechanisms may also be used without departing from the spirit or scope of aspects of the subject matter described herein.

When the database driver 210 is instructed to provide data as an array, the database driver 210 may buffer the data requested until the entire data is available to send to the application 205. The database driver 210 may do this, in part, so that it can return any portion of the data to the application 205.

The application 205 may request a portion of a data set to be available as an array and a portion of a data set to be available as a stream. For example, the application 205 may request that certain columns of a row be made available as an array while other columns of the row be made available as a stream.

When the database driver 210 is instructed to provide data as a stream, the database driver 210 may provide data to the application 205 as requested and may wait to retrieve more data from the database 215 until that data is requested by the application 205. After the application has requested a particular piece of data and the database driver 210 has provided the data, the database driver 210 may free the memory associated with that data (with an exception indicated below).

To conform with prior versions of the database driver 210, for example, the database driver 210 may provide the data as an array by default. If the application 205 does not specify how the data is to be accessed, the database driver 210 may assume that the application is going to access the data as an array and may buffer the data before providing it to the application as has been described previously.

Figure 3:
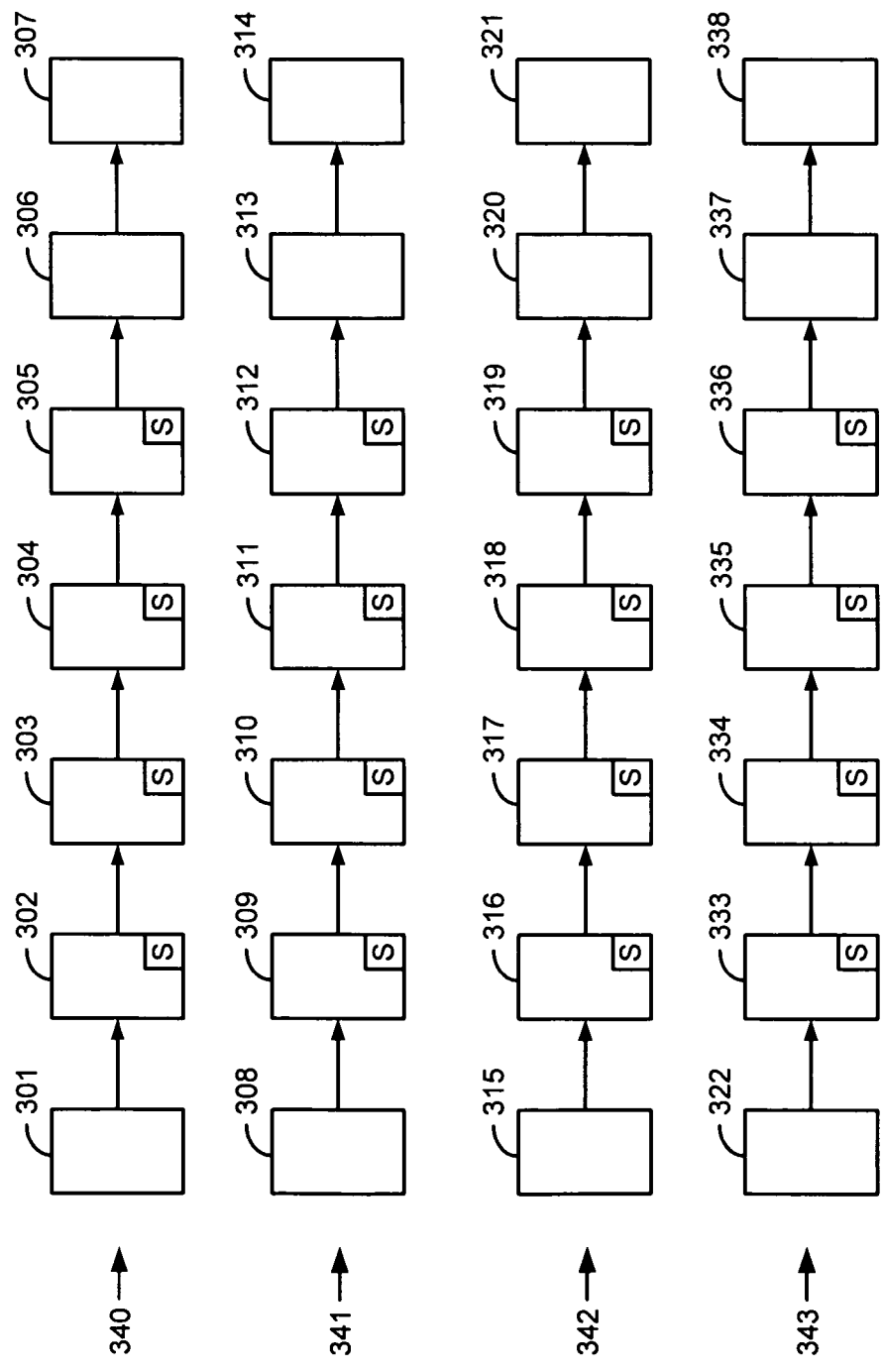
FIG. 3 is a block diagram that illustrates buffering by a database driver in accordance with aspects of the subject matter described herein.

FIG. 3 is a block diagram that illustrates buffering by a database driver in accordance with aspects of the subject matter described herein. As illustrated in FIG. 3, there are four rows 340-343 of blocks. Each of the four rows 340-343 of blocks may correspond to a row of a table of a database.

Each of the blocks 301-338 corresponds to a chunk of data (e.g., a TDS packet) returned by a database to a database driver in response to a query sent by a database driver.

When a block includes an S, this indicates that the block is associated with a stream. Although each of the rows 340-343 are illustrated as having four streaming blocks per row, in other data sources the rows may have less than or more than four streaming blocks per row and may even have a different number of streaming blocks from row to row. In one embodiment, the S's illustrated in FIG. 3 are for convenience only in illustrating that some blocks may include streaming data while other blocks include non-streaming data. In this embodiment, the database driver may not store an actual indicator that indicates whether blocks include streaming or non-streaming data.

In operation, an application may request that data be returned in a forward only, read only result set. This means that when the application requests a next row of data from the database driver that the application is not able to go back to the previous row without issuing a new query. For example, if the application is currently on the row 340 and requests the next row (e.g., row 341) of data, the application cannot go back to row 340 and request more data.

When the application requests data in this manner, the database driver may retain a row of data until the application requests the next row. After the application has requested the next row, the database driver may free the memory of the current row.

In one embodiment, this may be done by linking together blocks with pointers, with each block of the row pointing to the block of the row that comes next. The database driver may also reference the first block of a row with a pointer. When the database driver stops referencing the first block of the row, it may no longer be referenced by any pointers. In some environments, when an item is no longer referenced, it may be freed and returned to memory by a garbage collection mechanism.

In a forward only result set, when the first item in a row is freed and returned to memory, the next item in the row is no longer referenced so it can be freed and returned to memory and so forth. Thus, by moving a pointer from the head of one row to the head of another row, the database driver may cause the memory associated with a row to be freed.

In addition, the database driver may fetch data from the database as needed. For example, the database driver may refrain from fetching another block of data from the database unless and until the application requests data included in that block. When the application requests the data, then the database driver may obtain it from the database.

Furthermore, in one embodiment, when the application indicates that data is streaming data, the database driver may use a variable to remember that it is in "streaming mode." When an application is streaming a value, the value data may be retrieved from the database at the same rate it is returned to the application, effectively reducing buffering to as little as a single block.

In an embodiment, the driver does not mark blocks as streaming blocks. Instead, the driver marks re-readable blocks in such a way as to lock them into memory. This may be done, for example, by referencing the blocks with a pointer or otherwise. Marks may be set at a variety of places, including, for example:

1. At the first block containing data for a row in a result set. This keeps the row in memory (except for streamed values as described below);
2. At the first block of a re-readable data value, to keep that value in memory. The value may be a column value (e.g., from a result set row), an OUT parameter value (e.g., from a stored procedure call), or the like; and
3. For scrollable result sets, at the start of the fetch buffer. The fetch buffer is a window of the N most recently fetched rows, within which the application may scroll without causing another request to the database to fetch additional rows.

In each block, referencing the next block in the ordered set of blocks, effectively creating a singly-linked list. When a data value is accessed as a stream with responseBuffering=adaptive, the blocks containing the value may be "unlinked" from the linked list as they are consumed by the application, and all references to them dropped, so that a garbage collector may eventually free them.

In reading stream data, an application may place a "bookmark" within the stream data. This bookmark indicates that the application may want to go back to the bookmark and reread the stream from that point. To accommodate this, the database driver may mark a bookmarked block and may hold a reference to the block. As long as the application does not release the bookmark, the database driver maintains the reference. This causes the block and all blocks that it refers to indirectly or directly to be maintained in memory even though they may include streaming blocks.

Once the application releases the bookmark, the database driver may release its reference to the bookmarked block. This may cause the streaming block it referenced, if any, to not have a reference, which may cause it to be removed from the linked list and freed, and so forth until a block is reached that has a reference other than one from the linked list. Such other reference may comprise a current location reference, a reference to block that is re-readable, or another reference indicating a block that needs to be retained in memory. This allows the database driver to seamlessly retain blocks that have been requested as arrays and to seamlessly free blocks that have been requested as streams when they are no longer needed.

For example, referring to FIG. 3, if a bookmark was placed on block 302 and the application read data to block 307 and then released the bookmark, the database driver would remove blocks 302-305 and then cause the reference of block 301 to refer to block 306.

An application may request data in a different order than it is returned by the database. For example, an application may request the data corresponding to block 301 followed by the data corresponding to block 307, followed by the data corresponding to block 306, and so forth. In this case, when the application requests the data corresponding to the block 307, the database driver requests and obtains the streaming data corresponding to blocks 302-305. This streaming data is retained until the database driver is sure that the application can no longer request the data in the same query.

For example, if the application has requested data in a forward only result set and requests blocks as indicated above and then requests data from the next row (e.g., row 341), the database driver may then free the data associated with the current row (e.g., row 340). As another example, if after the requests above, the application requests data from the streaming blocks by starting at block 302 and reading forward, the database driver may free each read streaming block after the application driver is sure that the application can no longer request the data in the particular block (e.g., if the application has not set a bookmark before or in the block and has requested data in the next block).

An application may request a scrollable result set. In making this request, in one embodiment, the application may request that it be given access to a certain number of rows at a time such that it can access any data value within the rows. In another embodiment, the database driver may provide a certain number of rows at a time as a default. After the application has requested a next row, in one embodiment, a row drops out of the scrollable set of rows, such that the application is unable to scroll to (e.g., retrieve data from) the row that was dropped out. In another embodiment, after the application has requested data past the end of a fetch buffer of N rows, the database driver may free blocks associated with the current fetch buffer and fetch the next N rows from the result set and place them in the fetch buffer. A row may include one or more values that are requested in array format and one or more values that are requested in a stream fashion.

In this case, a database driver may obtain data in rows upon demand as requested by the application. For example, if the number of scrollable rows is four, the database driver maintains references to the rows that are in the scrollable data. When the application requests the next row (and the scrollable area is full), the database driver drops the reference to the first block of the first row in the scrollable data (e.g., block 301) thus allowing the blocks associated with the first row 340 to be freed and returned to memory. As the application requests data in the next row, the database driver requests data from the database and allocates blocks to hold this data. This allows the application to request any data within a scrollable window.

In addition, in one embodiment, while working within a scrollable window, if the application begins reading a data value that is streamed, the database driver may free blocks corresponding to the stream as described previously. In another embodiment, while working within a scrollable window, if the application begins reading a data value that is streamed, the database driver may refrain from freeing blocks corresponding to the stream until those blocks pass out of the scrollable window.

Figure 4:
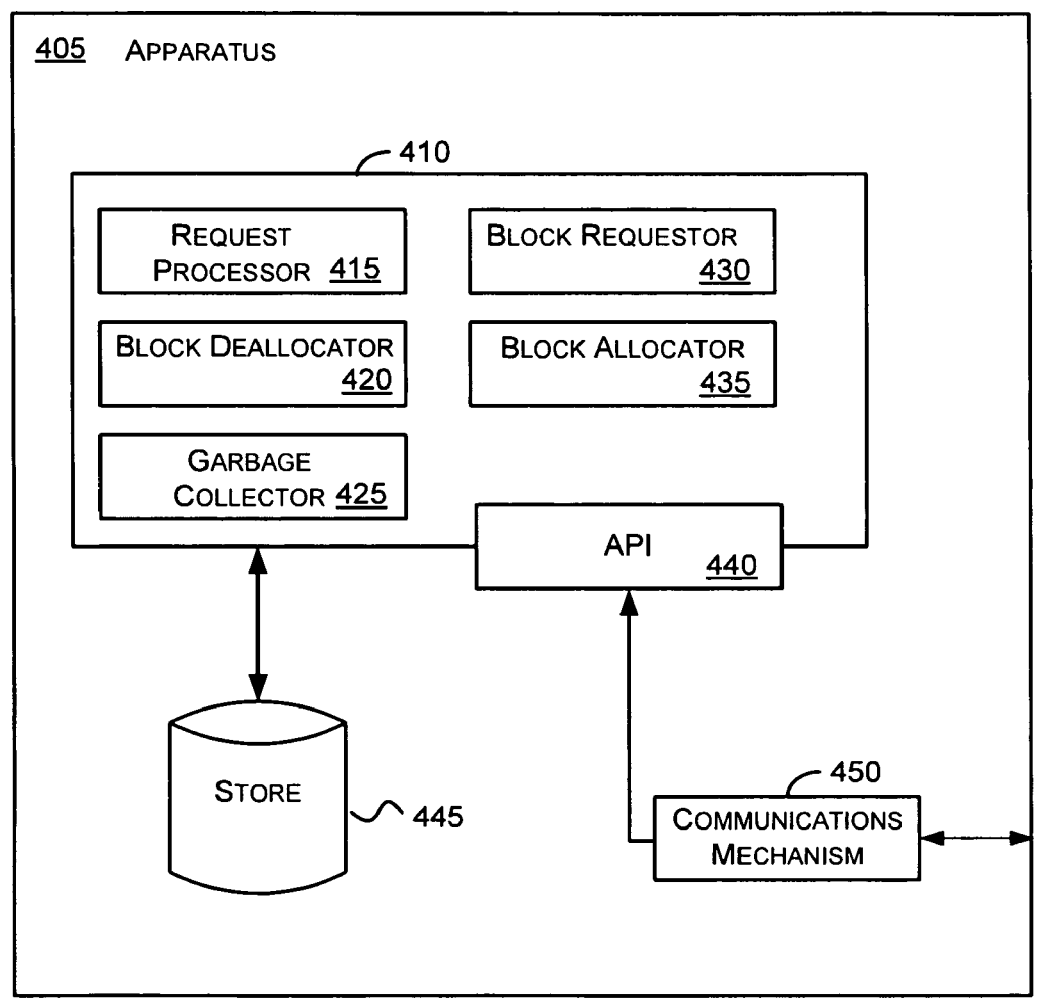
FIG. 4 is a block diagram that represents an exemplary apparatus configured to host a database driver in accordance with aspects of the subject matter described herein.

FIG. 4 is a block diagram that represents an exemplary apparatus configured to host a database driver in accordance with aspects of the subject matter described herein. The components illustrated in FIG. 4 are exemplary and are not meant to be all-inclusive of components that may be needed or included. In other embodiments, the components or functions described in conjunction with FIG. 4 may be included in other components or placed in subcomponents without departing from the spirit or scope of aspects of the subject matter described herein. In some embodiments, the components or functions described in conjunction with FIG. 4 may be distributed across multiple devices that are accessible to the apparatus 405.

Turning to FIG. 4, the apparatus 405 may include a database driver 410, a store 445, and a communications mechanism 450. The database driver 410 may include a request processor 415, a block deallocator 420, a garbage collector 425, a block requester 430, a block allocator 435, and an application programming interface (API) 440. The database driver 410 corresponds to the database driver 210 of FIG. 2 while components 415-435 of the database driver 210 correspond to the block manager 225 of FIG. 2.

The communications mechanism 450 allows the apparatus 405 to communicate with the database 215 as shown in FIG. 2. The communications mechanism 450 may also allow the apparatus to communicate with the application 205 if it is on a different device, for example. The communications mechanism 450 may be a network interface or adapter 170, modem 172, or any other mechanism for establishing communications as described in conjunction with FIG. 1.

The store 445 is any storage media capable of storing buffered blocks of data corresponding to portions or all of a data set. The store 445 may comprise a file system, database, volatile memory such as RAM, other storage, some combination of the above, and the like and may be distributed across multiple devices. The store 445 may be external or internal to the apparatus 405.

The request processor 415 is operable to receive a request for data from the API 440 and to locate and to locate where data corresponding to the request is located. The data may be located on the store 445 or may need to be requested from a database (e.g., the database 215 of FIG. 2).

The block deallocator 420 is operable to indicate blocks in the store corresponding to data that the requester is no longer allowed to obtain during the query. In one embodiment, this is performed by removing references to the block. The block deallocator 420 may also include logic to determine whether the requester is no longer allowed to obtain certain data. For example, if the requester has moved to the next row in a read forward only data set, the block deallocator 420 may determine that the requester is no longer allowed to obtain data from the current row.

The phrase "allowed to obtain" as used herein does not mean that the requester cannot request the data. Rather, it means that, based on the way the data has been accessed, the driver will no longer provide the data as it has been discarded. If a requester requests data that the requester is not allowed to obtain, the driver may throw an exception. In some cases, the exception may indicate that the operation is not supported (e.g., if the application attempts to request previously requested data in a forward only result set). In other cases, the exception may indicate that the data is no longer accessible. This may happen, for example, if the requester attempts to obtain stream data multiple times.

The garbage collector 425 is operable to return blocks to the free memory pool. The garbage collector 425 may use one or more garbage collection techniques as are known to those skilled in the art. In some embodiments, in non-managed environments, the garbage collector 425 is optional as information regarding whether blocks may be freed may be explicitly tracked (e.g., through reference counting or some other mechanism) and explicitly freed when no longer referenced.

The block requester 430 is operable to obtain data from the database and to store the data in blocks allocated by the block allocator 435. After determining that a block is not available in the store 445, the request processor 415 may request that the block requester 430 obtain data from a database to obtain the block. The block requester 430 may store skipped data that has not been requested by the requester in the store 445. Skipped data is data in a data set between two portions of the data that have been requested by the requester.

The block allocator 435 is operable to allocate blocks in the store 445. The block allocator 435 may link related blocks (e.g., blocks of the same row) together in a linked list. The block allocator 435 may use one or more memory allocation techniques as understood by those skilled in the art.

The API 440 is operable to receive a query and one or more requests associated with the query. A query defines a data set that is available from a database and may be specified in any of a number of formats without departing from the spirit or scope of aspects of the subject matter described herein. The interface provides a facility by which a requester is able to indicate under what one or more circumstances a requester is allowed to obtain previously obtained data during the query. This facility may comprise a method call, a parameter to a method call, a shared memory location in which a flag is stored, some other mechanism, and the like. The facility may allow the requester to indicate whether the requested data is to be provided at least as a stream or as an array.

Figure 5:
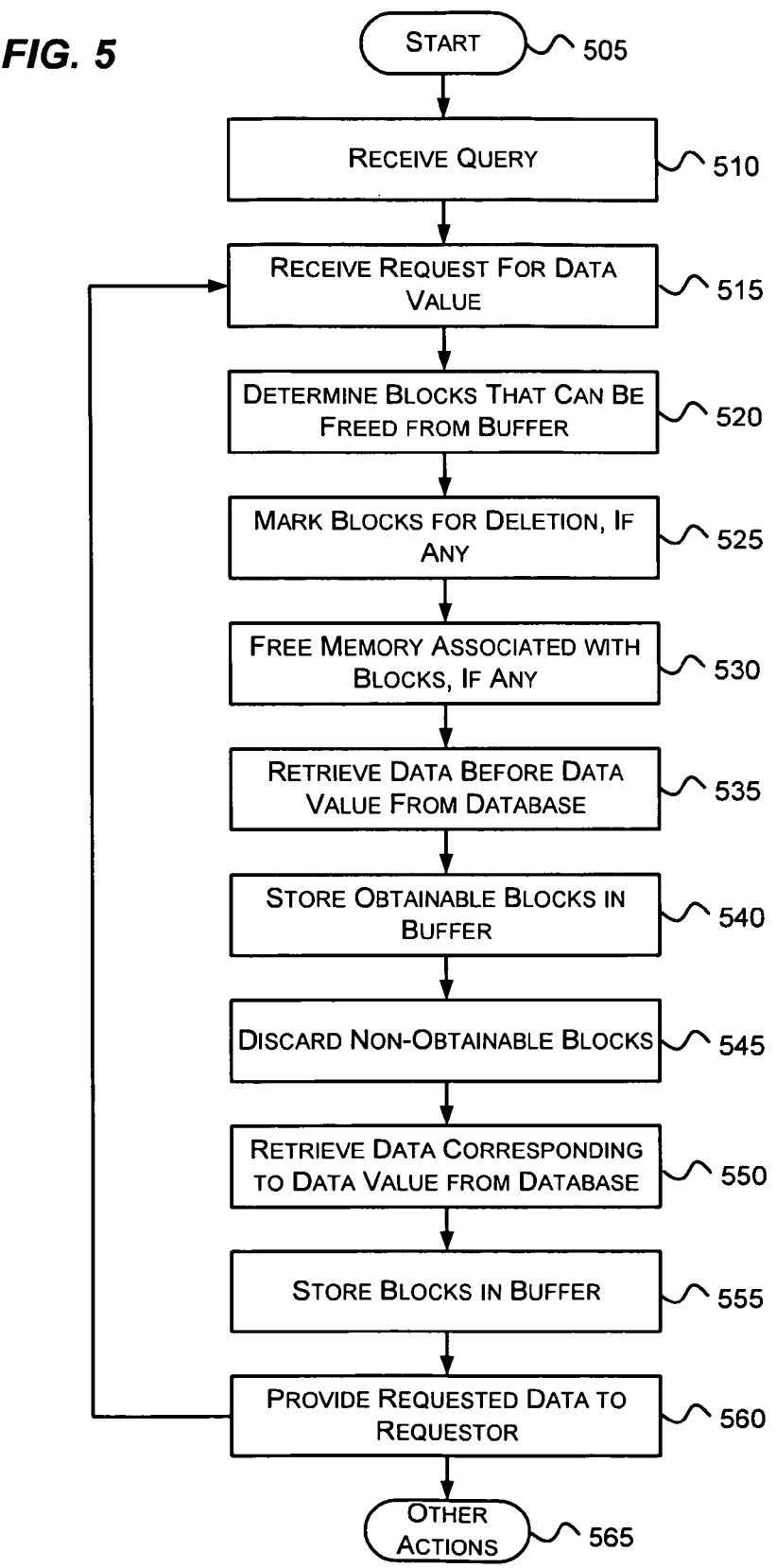
FIGS. 5 and 6 are flow diagrams that generally represent actions that may occur in conjunction accessing data via a database driver in accordance with aspects of the subject matter described herein.
Figure 6:
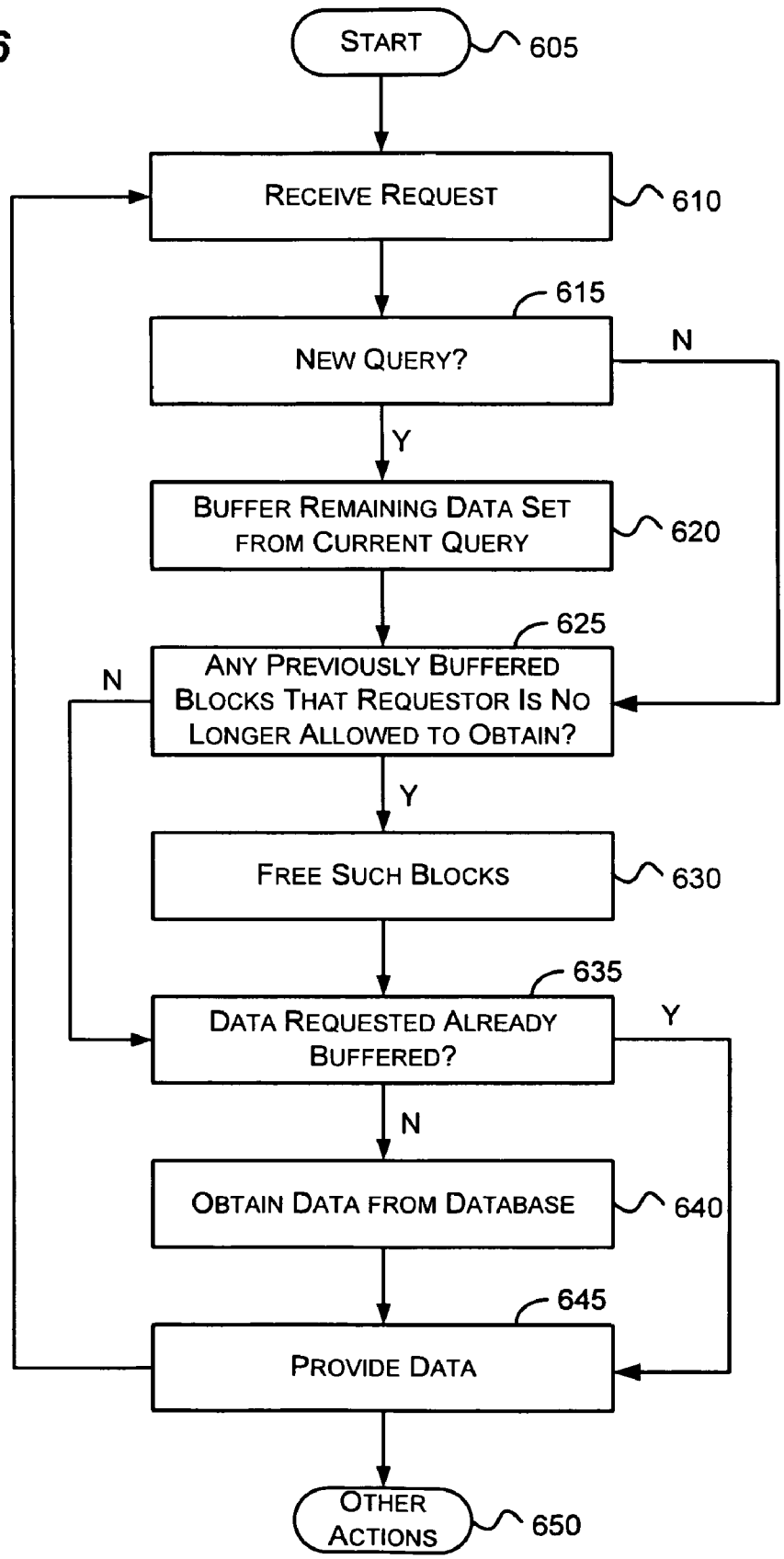

FIGS. 5 and 6 are flow diagrams that generally represent actions that may occur in conjunction accessing data via a database driver in accordance with aspects of the subject matter described herein. The actions illustrated in FIGS. 5 and 6 represent exemplary actions that may occur in obtaining data from a database and managing a buffer of a database driver. FIG. 5 illustrates one exemplary set of actions that may occur in this process while FIG. 6 illustrates another exemplary set of actions that may occur in this process.

For simplicity of explanation, the methodology described in conjunction with FIGS. 5 and 6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, a query is received. For example, referring to FIG. 2, the database driver 210 receives a query from the application 205. The query defines a data set that is available from the database 215. For example, the query may indicate certain rows and values (e.g., columns) to be returned from the database and may indicate an order in which results are to be returned.

The query may also indicate whether a requester is allowed to obtain previously obtained data from the database driver during the query. For example, the query may indicate that data is to be returned in a forward only, read only result set as described previously. As another example, the requester may indicate that the data is to be returned in a scrollable result set as described previously.

At block 515, a request for a data value from the query is received. For example, referring to FIG. 2, the database driver 210 may receive a request for a third data value of a particular row of a result set. In one embodiment, a data value represents whatever is contained in a field (e.g., column) of a row of the result set. A data value may include simple data types such as integers, currency, other numeric formats, strings, and the like, arbitrary binary data that may comprise a sequence of one or more bytes, other data, and the like.

At block 520, a determination is made as to whether any blocks in the buffer may be freed. For example, referring to FIG. 4, the block deallocator 420 may determine blocks in the store 445 which the requester is no longer allowed to obtain during the query. Such blocks may correspond, for example, to rows or other data that the requester is no longer able to access. For example, after a requester requests a next row of data, the requester may no longer be allowed to obtain data in a row before the new row. As another example, in a stream, a requester may not be able to read previous portions of the stream unless the requester has set a bookmark in the stream.

At block 525, blocks, if any, are marked for deletion. For example, referring to FIGS. 3 and 4, the block deallocator 420 may remove a reference (e.g., a current row reference) to the block 301. In doing so, the block deallocator 420 may be marking this block and indirectly marking blocks it refers to directly and indirectly (e.g., blocks 302-307) for deletion.

At block 530, memory associated with the blocks, if any, is freed. For example, referring to FIGS. 3 and 4, the garbage collector 425 may return the blocks 301-307 to a free pool of memory as they are no longer referenced.

At block 535, data, if any, in the data set that occurs before the requested data value is retrieved. For example, referring to FIG. 3, if data value included in block 305 is requested, the data in blocks 301-304 may be obtained from the database before obtaining the data in block 305.

At block 540, obtainable blocks of the data, if any, are stored in a buffer. Obtainable in this sense indicates blocks that a requester is still allowed to obtain during the query. For example, referring to FIG. 3, as long as the requester is examining data in the row 340, the requester may be able to obtain data associated with any of the blocks of the row. When the requester requests data in the row 341, the requester may no longer have an option of obtaining data in the row 340.

At block 545, non-obtainable blocks of the data are discarded. For example, referring to FIG. 3, if the requester was currently on row 340 and requested data in the data block 311 of row 341, the database driver may read the rest of the blocks of the row 340 and discard these blocks as they are no longer obtainable by the requester during the query.

At block 550, data corresponding to the data value is retrieved from the database. For example, referring to FIG. 3, if the data value is included in the block 313, this block is retrieved from the database.

At block 555, one or more blocks corresponding to this data are stored in the buffer. For example, referring to FIG. 4, the block requester 430 may store one or more blocks corresponding to the data value in the store 445.

At block 560, the requested data is provided to the requester. For example, referring to FIG. 2, the database driver 210 provides the requested data value to the application 205. If a requester sends another request for data during the query, the actions may continue at block 515; otherwise, the actions may continue at block 565.

At block 565, other actions, if any, may be performed.

Note that as has been indicated previously, the actions described above may be performed in many different orders. For example, a garbage collector may free unused blocks according to its own schedule with the result being that the actions associated with block 530 may occur any time after the actions associated with block 525. As another example, the actions associated with blocks 420-530 may be performed in parallel with or after the actions associated with blocks 535-560.

Turning to FIG. 6, at block 605, the actions begin. At block 610, a request for data from a data set is received at a database driver. For example, referring to FIG. 2, the database driver 210 may receive a request for a data value of a result set or a request that indicates that the application 205 seeks to initiate a new query.

At block 615, a determination is made as to whether the request is part of a new query. If so, the actions continue at block 620; otherwise, the actions continue at block 625. A requester may be allowed to perform a second query during a first query. For example, referring to FIG. 2, if the database driver 210 receives a second query from the application 205 while the database driver 210 is servicing a first query from the application 205, the actions continue at block 620.

At block 620, any remaining portion of the data set of the current query is buffered before obtaining data from the next query. For example, referring to FIG. 4, a block requester 430 obtains the rest of a data set from a current query and stores blocks corresponding to the data so obtained in the store 445.

At block 625, a determination is made as to whether there are any previously buffered blocks that the requester is no longer allowed to obtain. If so, the actions continue at block 630; otherwise, the actions continue at block 635. For example, referring to FIG. 4, the block deallocator 420 may determine whether there are any previously buffered blocks corresponding to data that the requester is no longer allowed to obtain during the query.

At block 630, blocks that the requester is no longer allowed to obtain are freed. For example, referring to FIG. 4, the block deallocator 420 may indicate that the previously buffered blocks determined at block 625 can be returned to a free memory pool.

At block 635, a determination is made as to whether the data requested is already buffered. If so, the actions continue at block 645; otherwise, the actions continue at block 640. For example, referring to FIG. 4, the request processor 415 may determine whether blocks including the data requested are included in the store 445 or not.

At block 640, data corresponding to the request is obtained from the database. For example, referring to FIG. 2, the database driver 210 may obtain one or more blocks corresponding to the data requested from the database 215. These blocks may be stored in the buffer 220.

At block 645, the data is provided to the requester. For example, referring to FIG. 2, the database driver 210 may respond to a request for data by providing the data to the application 205. If another request is received, the actions continue at block 610; otherwise, the actions continue at block 650.

At block 650, other actions, if any, may be performed.

As can be seen from the foregoing detailed description, aspects have been described related to buffering database server response data. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving, at a database driver, a query that defines a data set available from a database, the query associated with information indicating whether a requestor is allowed to obtain previously obtained data from the database driver during the query;
   receiving a first request to read a first data value of the data set; and
   in response to the first request:
      retrieving a first set of zero or more blocks of data from the database corresponding to data that occurs in the data set before the first data value;
      storing each of the blocks that is still allowed to be obtained during the query in a buffer;
      discarding each of the blocks that is not still allowed to be obtained in the query, retrieving a second set of zero or more blocks of data corresponding to the first data value;
      storing the second set of zero or more blocks of data in the buffer; and
      marking a block associated with a data value that has a non-stream access mode to lock the block until the requestor is no longer allowed to obtain the block during the query.

2. The method of claim 1, further comprising:
   receiving a second request to read a second data value of the data set;
   determining a third set of zero or more blocks that includes zero or more blocks in the first and/or second sets of blocks, the third set of zero or more blocks not still being allowed to be obtained during the query based on the second request; and
   for each block of the third set of zero or more blocks:
      updating a data structure that referenced the block; and
      freeing memory associated with the block.

3. The method of claim 2, wherein determining a third set of zero or more blocks that includes zero or more blocks in the first and/or second sets of blocks, comprises:
   determining if a block in the first or second sets of blocks is being accessed as a stream and if so,
   determining if the block is associated with a bookmark or is preceded in the stream by any other block that has a bookmark associated therewith.

4. The method of claim 1, wherein an access mode is received in conjunction with a request to read a data value, the access mode indicating that the data value is to be provided in a stream or a non-stream manner.

5. The method of claim 4, wherein data included in the block is included in a row of the database and further comprising freeing the block after the requestor requests another row of the database.

6. The method of claim 4, further comprising freeing the block associated with a data value that has a stream access mode after data included in the block has been provided to the requestor.

7. The method of claim 1, wherein retrieving the first and second sets is not performed until after receiving the first request.

8. The method of claim 1, further comprising placing blocks included in the first and second sets in a linked list, the linked list ordering the blocks in an order in which they are obtained from the database driver.

9. The method of claim 1, wherein a query spans a time that starts when the requestor sends the query and ends when the requestor cancels or indicates that the requestor is finished with the query.

10. A computer storage medium having computer-executable instructions, which when executed perform actions, comprising:
    receiving, at a database driver, a request from a requestor for data from a data set, the request associated with information that indicates one or more circumstances in which the requestor is allowed to obtain previously obtained data of the data set from the database driver; and
    in response to receiving the request, performing actions, comprising:
       determining if the requestor is not allowed to obtain data that has been previously buffered and if so, freeing the data that has been previously buffered, and
       determining if the data is already buffered by the database driver,
       if the data is already buffered by the database driver, providing the data, and
       if the data is not already buffered by the database driver, obtaining more of the data set from a database;
    wherein the one or more circumstances comprise a circumstance in which the request is submitted in a query having a scrollable result set, the scrollable result set defining a number of contiguous rows from the database that the requestor is able to access in any order.

11. The hardware computer storage medium of claim 10, wherein the information comprises a parameter provided by the requestor to the database driver, the parameter indicating that a requested value is to be provided as a stream, wherein a previously provided portion of the stream is not allowed to be obtained by the requestor unless a bookmark is set at or before a beginning of the previously provided portion of the stream.

12. The hardware computer storage medium of claim 11, further comprising:
    determining if the request for data from the data set is a request to access the data in a stream; and
    if the request from a requestor for the data from the data set is a request to access the data in a stream, after providing the data to the requestor, indicating that memory associated with the data is suitable for garbage collection unless a bookmark is set in the stream prior to or at the data.

13. The hardware computer storage medium of claim 10, further comprising receiving an other request for data from another data set and in response to the other request, performing actions, comprising:
- obtaining second data from the data set that has not previously been obtained;
- buffering the second data in memory associated with the database driver;
- obtaining data from the database for requests for data from the second data set upon demand;
- buffering data from the second data set until the requestor is no longer allowed to obtain it in conjunction with requesting data from the second data set.

14. The hardware computer storage medium of claim 10, wherein the one or more circumstances comprise a circumstance in which the request is submitted for data that has been requested for access as a stream.

15. In a computing environment, an apparatus, comprising:
- an interface configured to receive a query and one or more requests associated with the query, the query defining a data set available from a database, the interface providing a facility by which the requestor is able to indicate under what one or more circumstances the requestor is allowed to obtain previously obtained data during the query;
- a store configured to store and provide blocks of data associated with the query;
- a block allocator configured to allocate blocks in the store;
- a block requestor configured to obtain data from the database, to store the data in blocks allocated by the block allocator, and to store skipped data that has not been requested by the requestor, the skipped data being in the data set between two portions of data that have been requested by the requestor;
- a request processor configured to receive a request via the interface and to locate where data corresponding to the request is located, the request requesting to read a value of the data set; and
- a block deallocator configured to indicate blocks in the store corresponding to data that the requestor is no longer allowed to obtain during the query.

16. The apparatus of claim 15, wherein the block deallocator is operable to indicate blocks in the store corresponding to data that the requestor is no longer allowed to obtain by removing references to the blocks.

17. The apparatus of claim 15, wherein the facility comprises method call by which the requestor indicates whether requested data is to be provided at least as a stream or as an array.

\* \* \* \* \*

UNITED STATES PATENT AND TRADEMARK OFFICE
CERTIFICATE OF CORRECTION

PATENT NO.         : 8,019,831 B2
APPLICATION NO.    : 12/104437
DATED              : September 13, 2011
INVENTOR(S)        : David W. Olix et al.

Page 1 of 1

It is certified that error appears in the above-identified patent and that said Letters Patent is hereby corrected as shown below:

In column 13, line 37, in Claim 1, delete "storing" and insert -- storing, by a hardware processing unit, --, therefor.

In column 13, line 40, in Claim 1, delete "query," and insert -- query; --, therefor.

In column 14, line 25, in Claim 10, delete "A computer" and insert -- A hardware computer --, therefor.

Signed and Sealed this
Twenty-fifth Day of October, 2011

David J. Kappos
*Director of the United States Patent and Trademark Office*